US008573321B2

(12) United States Patent
Audigie

(10) Patent No.: US 8,573,321 B2
(45) Date of Patent: Nov. 5, 2013

(54) FOLDABLE SEEDER

(75) Inventor: Jean-Charles Audigie, Bouxwiller (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 13/576,176

(22) PCT Filed: Feb. 17, 2011

(86) PCT No.: PCT/FR2011/050342
§ 371 (c)(1),
(2), (4) Date: Jul. 31, 2012

(87) PCT Pub. No.: WO2011/104467
PCT Pub. Date: Sep. 1, 2011

(65) Prior Publication Data
US 2012/0304906 A1  Dec. 6, 2012

(30) Foreign Application Priority Data
Feb. 23, 2010  (FR) .................................... 10 51271

(51) Int. Cl.
*A01B 49/06*  (2006.01)
(52) U.S. Cl.
USPC ........... 172/311; 172/456; 172/459; 172/636; 172/639; 172/640; 111/57
(58) Field of Classification Search
USPC ................. 172/451, 456–460, 310, 311, 662, 172/634–637, 639, 640; 111/52, 57, 1
See application file for complete search history.

(56) References Cited

U.S. PATENT DOCUMENTS

| 6,003,615 | A | 12/1999 | Moore |
| 2003/0226915 | A1 | 12/2003 | Michel |

FOREIGN PATENT DOCUMENTS

| DE | 43 03 101 | 8/1994 |
| DE | 100 40 056 | 2/2002 |
| EP | 0 420 734 | 4/1991 |
| EP | 1 356 720 | 10/2003 |

OTHER PUBLICATIONS

International Search Report Issued Jul. 4, 2011 in PCT/FR11/50342 Filed Feb. 17, 2011.

*Primary Examiner* — Christopher J Novosad
(74) *Attorney, Agent, or Firm* — Oblon, Spivak, McClelland, Maier & Neustadt, L.L.P.

(57) ABSTRACT

A seeder including a chassis including a substantially horizontal transverse beam on which seeding elements are distributed in a regular manner, the transverse beam including a central section and two lateral sections arranged on either side of the central section in a work position, and being raised substantially above the central section in a transport position, each lateral section being connected to the chassis by a respective arm and being displaceable transversely and vertically with respect to the chassis by a deformable mechanism controlled by an operating jack. In the seeder one deformable mechanism is offset with respect to the other deformable mechanism, taking into account a direction of advance.

9 Claims, 3 Drawing Sheets

FOLDABLE SEEDER

BACKGROUND

The present invention relates to the general technical field of agricultural machinery. The invention concerns a seeder comprising a chassis with a substantially horizontal transverse beam on which seeding elements are distributed in a regular manner, the transverse beam has a central section and two lateral sections arranged on either side of the central section in a work position and being raised substantially above the central section in a transport position, each lateral section being connected to the chassis by a respective arm and being displaceable transversely and vertically with respect to the chassis by a deformable mechanism controlled by an operating jack.

Such a seeder with a foldable chassis is displayed, for example, in the brochure "MAXIMA 2 Precision pneumatic seeders" of KUHN S. A. It comprises a chassis with a transverse beam on which seeding elements are distributed at constant and adjustable intervals. The transverse beam is constituted by a fixed central section and two lateral sections. The lateral sections are connected to the chassis via a respective arm. This mounted seeder has a working width of 6 m when the lateral sections extend on either side of the central section with an overall size for road movements of 3 m in width. For transport, the lateral sections are raised transversely and vertically above the central section for transport via a deformable mechanism controlled by an operating jack. The deformable mechanism has a connecting-rod linked to a lever by an upper articulation with an axis which is horizontal and directed in the direction of advance.

As a working width of 6 m does not permit travel on the roads, the seeder is folded to reduce the space occupied in width to a sufficient extent to permit movements on the road. In this transport position, the lateral sections are arranged one against the other above the central section. The arms and also the connecting-rods extend substantially vertically. By this end-to-end arrangement of the lateral sections in the transport position, the limits of the overall dimension for road movements in accordance with road legislation are reached. Thus, it is not possible to increase the working width of this seeder without exceeding the limits of the regulatory overall dimension for road movements.

BRIEF SUMMARY

The present invention has the aim of proposing a seeder having a greater working width with a robust and stable chassis and respecting the permitted overall dimension for movements on the roads.

To this end, an important feature of the invention consists in that one deformable mechanism is offset with respect to the other deformable mechanism, taking into account the direction of advance. This offset permits the deformable mechanisms to cross each other passing one beside the other so as to obtain a particularly compact seeder in the transport position.

According to an advantageous embodiment of the invention, at least one articulation extends beyond the median vertical plane of the seeder in the transport position. Owing to this feature, the seeder, whilst having a greater working width, respects the occupied space in width and in height of the overall dimension for road movements.

According to another important feature, each articulation extends beyond the median plane of the seeder in the transport position. In this way, the overall dimension for road movements is respected with regard to the transport width of the folded seeder. The occupied space in height is also reduced. This reduction in height advantageously permits the ground clearance of the seeder to be increased. This additional clearance with respect to the ground makes movements on uneven paths easier.

BRIEF DESCRIPTION OF THE DRAWINGS

Other features and advantages of the invention will emerge from the following description with respect to the attached drawings which are only given by way of non-restrictive examples of the invention. In these drawings.

DETAILED DESCRIPTION

Figure 1:
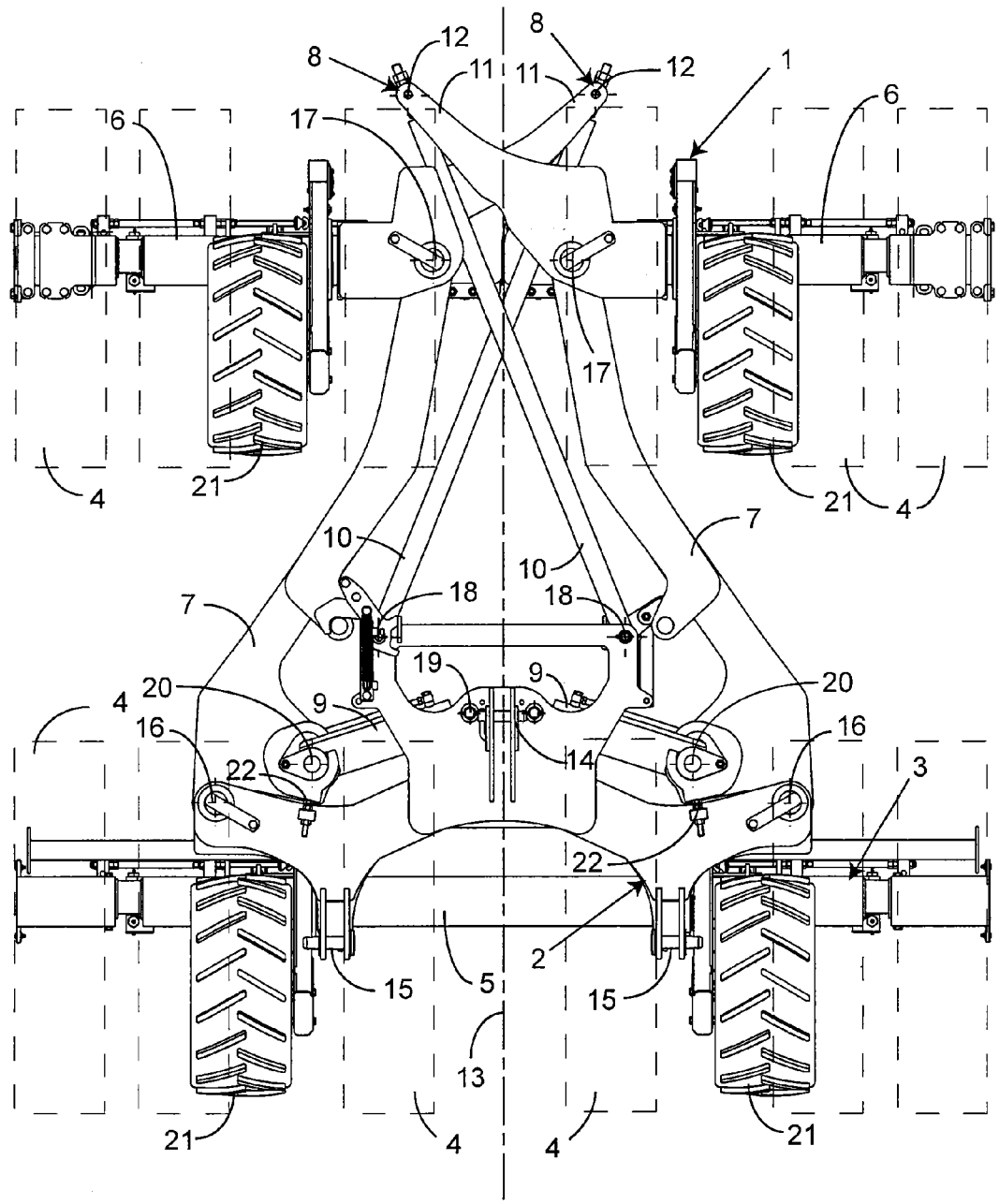
FIG. 1 represents, in front view, a seeder according to the present invention in a transport position.

The agricultural machine according to the invention is a seeder (1) of the single seeder or element seeder type. Such a seeder (1) distributes the seeds one by one on the seeding line at constant intervals. FIG. 1 represents, in front view, such a seeder in transport position. The seeder (1) comprises a chassis (2) constituted by a substantially horizontal transverse beam (3) on which seeding elements (4) are distributed in a regular manner. The seeding elements (4) are represented in diagrammatic form in the figures. The transverse beam (3) has a central section (5) and two lateral sections (6). The lateral sections (6) are arranged on either side of the central section (5) in a work position. The lateral sections (6) are raised substantially above the central section (5) in a transport position. Each lateral section (6) is linked to the chassis (2) by a respective arm (7). It is displaceable transversely and vertically with respect to the chassis (2) by a respective deformable mechanism (8) controlled by an operating jack (9). Each deformable mechanism (8) has a connecting-rod (10) linked to a lever (11) by an articulation (12) having an axis which is substantially horizontal and parallel to the direction of advance (A). The lateral sections (6) are arranged on either side of the median vertical plane (13) of the seeder (1) or of the chassis (2). The seeding elements (4) are advantageously distributed symmetrically on the transverse beam (3) with respect to the median vertical plane (13).

Figure 3:
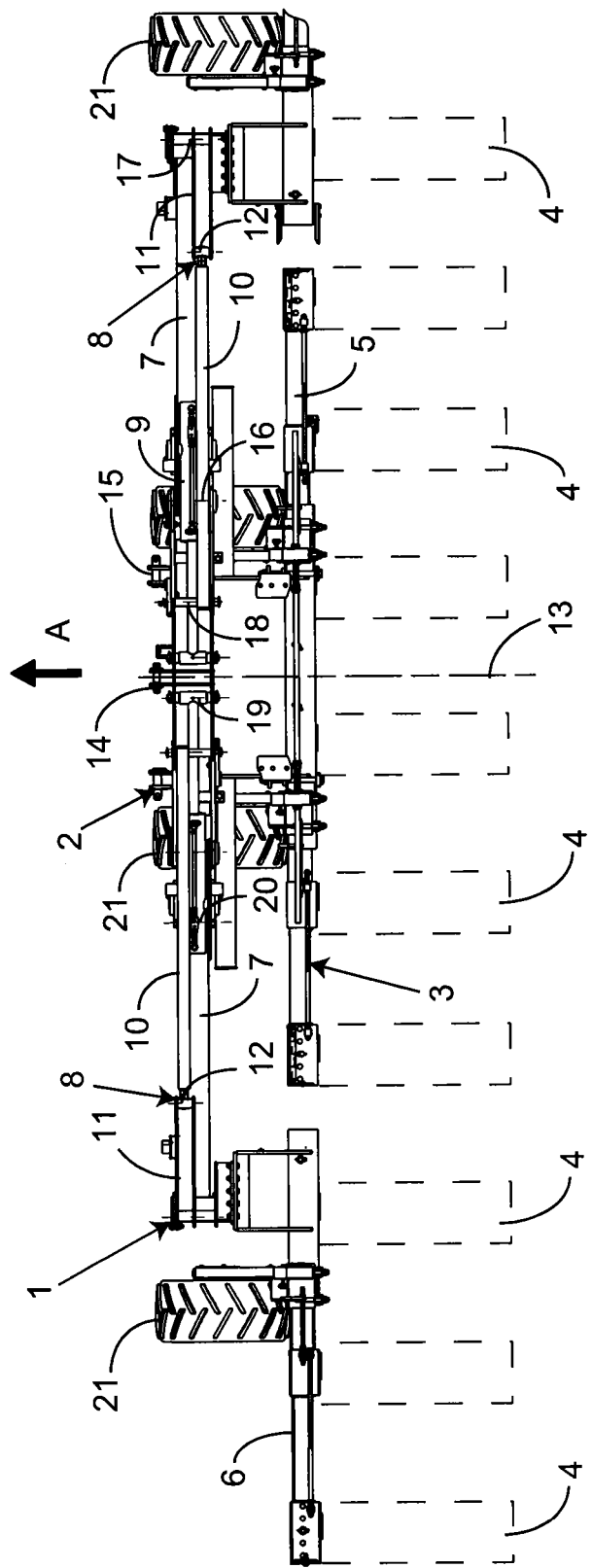
FIG. 3 represents a top view of the seeder according to the invention.

According to an important feature of the invention, one deformable mechanism (8) is offset with respect to the other deformable mechanism, taking into account the direction of advance (A). In FIG. 3, representing a top view of the seeder (1), the deformable mechanism (8) arranged on the left, taking into account the direction of advance (A), extends more forward than the deformable mechanism (8) arranged on the right. This offset permits the deformable mechanisms (8) to cross each other passing one beside the other so as to obtain a particularly compact seeder in the transport position. Each deformable mechanism (8) extends substantially in the occupied space with regard to width of the corresponding arm (7). The connecting-rod (10) and the lever (11) on the left side are offset forward with respect to the connecting-rod (10) and to the lever (11) on the right side. The width of the connecting-rod (10) is less than the width of the corresponding arm (7). Preferably, the width of an arm (7) corresponds to twice the width of a connecting-rod (10).

According to another aspect of the invention, at least one articulation (12) extends beyond the median vertical plane (13) of the seeder (1) in the transport position. In this way, a compact folding is obtained for transport. The articulation (12) has an axis which is substantially horizontal and parallel to the direction of advance (A). Thus, the seeder, whilst having a greater working width, respects the occupied space with regard to width of the overall dimension for road movements.

In the light of FIG. 1, the design of the chassis (2) is advantageously symmetrical with respect to the median vertical plane (13). Due to this design, the stresses are advantageously symmetrical during work and during transport. The seeder (1) is therefore well balanced and stable. The lateral sections (6) are folded above the central section (5) and are advantageously aligned. The inner ends of the two lateral sections (6) are arranged end-to-end, which allows the chassis to be made rigid during displacements.

According to another important feature of the invention, each articulation (12) extends beyond the median vertical plane (13) of the seeder (1) in the transport position. The articulations (12), by folding beyond the median vertical plane (13), allow the occupied space with regard to width to be further reduced. The occupied space with regard to height of the seeder (1) is also reduced, permitting an additional clearance with respect to the ground. The overall dimension for road movements is therefore respected during transport with regard to the width and the height of the seeder.

Figure 2:
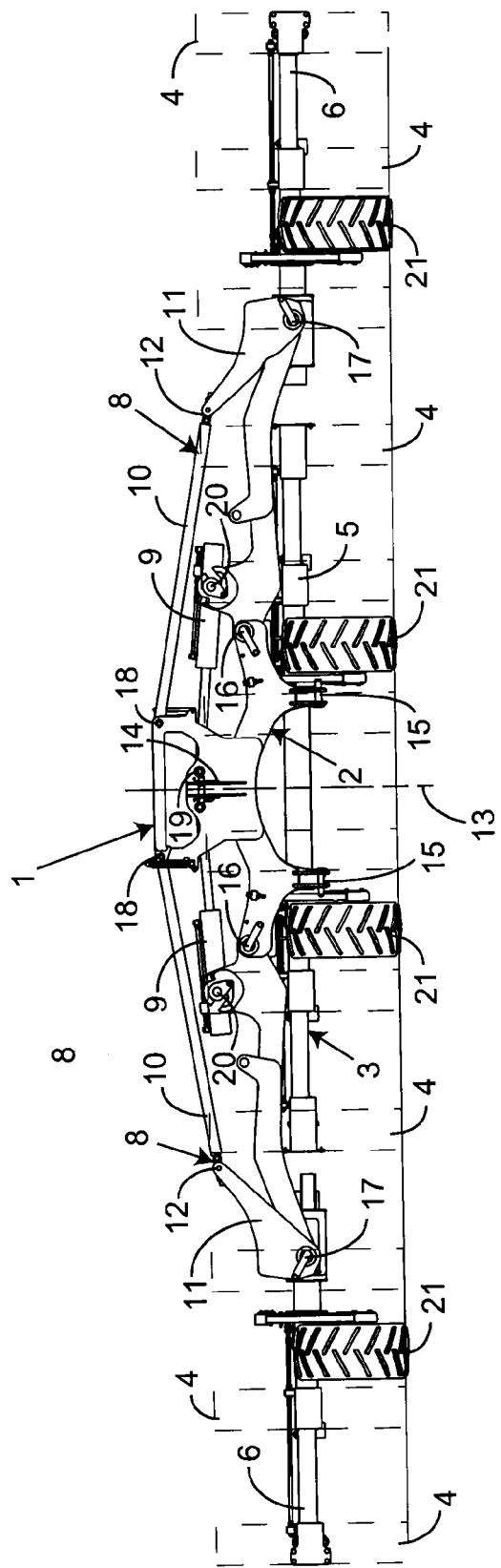
FIG. 2 is a front view of the seeder of the invention in a work position.

FIG. 2 represents the seeder (1) in a work position. The chassis (2) is provided with a hitching device of the three-point type composed of an upper hitching point (14) and two lower hitching points (15). This seeder (1) is intended to be hitched to the hitching system of a tractor (not represented); it is carried by the tractor. The tractor displaces and actuates the seeder (1) following a course and a direction of advance indicated by the arrow (A). In the following description, the following terms "front", "rear" and "in front", "behind" are defined with respect to the direction of advance (A) and the terms "right" and "left" are defined looking at the seeder (1) from the rear in the direction of advance (A).

In the work position, the lateral sections (6) are aligned and extend in the extension of the central section (5). The arms (7), articulated between the chassis (2) and the respective lateral section (6) extend substantially horizontally. The articulation (12) is arranged at the level of the outer end of the connecting-rod (10). The connecting-rod (10) extends above the arm (7). The deformable mechanism (8) extends substantially above the arm (7) so as to form a deformable quadrilateral and preferably a parallelogram. Thus, each lateral section (6) carries out a displacement substantially parallel to the ground from the work position to the transport position, and vice versa. The articulation (12) constitutes the upper outer edge of the deformable mechanism (8) respectively of the parallelogram; this articulation (12) is also called outer articulation. The arm (7) is connected on one hand to the chassis (2) via a first articulation (16) with an axis which is substantially horizontal and directed in the direction of advance (A), and on another hand to the respective lever (11) by a second articulation (17) with an axis which is substantially horizontal and directed in the direction of advance (A). The connecting-rod (10) is, itself, connected on one hand to the chassis (2) via an inner articulation (18) with an axis which is substantially horizontal and directed in the direction of advance (A), and on another hand to the respective lever (11) by the outer articulation (12). Each operating jack (9) extends between the chassis (2) and the respective arm (7). The jack is articulated on the chassis via a third articulation (19) and articulated on the arm (7) via a fourth articulation (20). The third articulation (19) and the fourth articulation (20) each present an axis which is substantially horizontal and parallel to the direction of advance (A).

The seeder of the invention has a great working width, preferably of 9 meters. Such a working width therefore requires a folding of the lateral sections (6) for movements on roads and paths. The chassis (2) carries seeding elements (4) distributed at constant and adjustable intervals on the transverse beam (3). Each seeding element (4) has a hopper, a metering device and a planting device. The assembly of the seeding element (4) to the chassis (2) is carried out by a deformable parallelogram which allows it to move parallel to the ground. In order to guarantee a homogeneous metering of the seeds, the rotational speed of the metering device is advantageously proportional to the advancing speed of the seeder (1). In the example embodiment represented in FIG. 2, the chassis (2) carries twelve seeding elements (4). The sections (5, 6) are constituted by a double telescopic beam. The design of the chassis (2) allows the spacing between the seeding elements (4) to be modified according to a great amplitude, from 70 to 80 cm. The central section (5) carries six seeding elements (4) and each lateral section (6) carries three seeding elements (4).

The seeding elements (4) are represented in a simplified manner by a frame of dashed line indicating the occupied space in height and in width of the seeding elements (4). These seeding elements (4) have as a characteristic that the metering device is arranged above the planting device, which means that it has a great height with a reduced length. Other seeding elements exist, for which the metering device is arranged in front of the planting device, entailing a greater occupied space in length with a reduced height.

During work, the chassis (2) rests on the ground by wheels (21). In the example of FIG. 2, two wheels (21) are linked on the central section (5), one wheel (21) is linked to each lateral section (6). These wheels (21) are intended to drive the metering device of the seeding elements (4). It is noted that the wheels (21) are placed in front of the transverse beam (3). With this arrangement at the front, the wheels (21) are not inserted between the seeding elements (4) and the possibilities for adjustment of the spacing between the seeding elements (4) are not limited. Moreover, the position of each wheel (21) can be adapted to the different spacings of the seeding elements (4) so that it can travel between two seeding rows.

Given that the wheel (21) is hitched in the central part of the lateral section (6), the connection of the lateral section (6) with the arm (7) is achieved at the level of its inner end. To adapt to the desired spacing of the seeding elements (4), the lateral sections (6) are mounted in an adjustable manner on the arms (7).

To reduce the occupied space of this large width seeder during transport on the road, the lateral sections (6) are folded vertically and transversely by operating jacks (9). According to FIG. 1, the seeding elements (4) are thus arranged symmetrically at two heights. On folding, the chassis (2) passes from a working width of 9 m to a transport width of 3 m 50 with single telescopic beams. Such a configuration is in accordance with the road legislation in France. Owing to the double telescopic beams of the sections (5, 6) which fold, the occupied space with regard to width is reduced to 3 m. This folding permits the occupied space with regard to width to be reduced to a sufficient extent to permit a movement on the road in a large number of European countries. The occupied space of the seeder (1) during transport therefore respects the overall dimension for road movements of 3 m in width and 4 m in height. As a function of the overall dimension for road movements which are sought, the sections (5, 6) are composed either of a double telescopic beam or of a single telescopic beam. Owing to the deformable parallelogram mechanism (8), the seeding elements (4) remain substantially on the horizontal during folding, which prevents the seeds contained in the hoppers from being shed.

Preferably, each articulation (12) extends substantially above the corresponding wheel (21) of the central section (5). The position of the first articulation (16) allows the occupied space with regard to width of the seeder (1) to be defined in the transport position. The position of the two lateral sections (6) for the transport is adjusted by respective stops (22). These stops (22) are adjusted so that the inner ends of the lateral sections (6) are in contact with one another. For movement of the seeder on the roads in total safety, each arm (7) is locked on the chassis (2) via a respective hook.

According to an example embodiment which is not shown, the seeder of the invention is trailed, i.e. the chassis rests on the ground during work and during transport by wheels.

It is readily evident that the invention is not limited to the embodiment described above and represented in the attached drawings. Modifications remain possible, in particular with regard to the constitution or the number of the various elements or by substitution of technical equivalents without, however, departing from the scope of protection as defined by the following claims.

The invention claimed is:

1. A seeder comprising:
   a chassis including a substantially horizontal transverse beam on which seeding elements are distributed at constant intervals,
   the transverse beam including a central section and two lateral sections arranged on either side of the central section in a work position and being raised substantially above the central section in a transport position,
   each lateral section being linked to the chassis by a respective arm and being displaceable transversely and vertically with respect to the chassis by a deformable mechanism controlled by an operating jack,
   wherein one deformable mechanism is offset with respect to the other deformable mechanism, taking into account a direction of advance, and
   wherein each deformable mechanism includes a connecting-rod linked to a lever by an articulation with an axis which is substantially horizontal and parallel to the direction of advance, and at least one articulation extends beyond the median vertical plane of the seeder in the transport position.

2. A seeder according to claim 1, wherein each articulation extends beyond the median vertical plane of the seeder.

3. A seeder according to claim 1, wherein the articulation extends above the respective arm in the work position.

4. A seeder according to claim 1, wherein an occupied space with regard to width of the arm corresponds to twice a width of the corresponding connecting-rod.

5. A seeder according to claim 1, wherein each deformable mechanism is a quadrilateral of parallelogram type.

6. A seeder according to claim 1, wherein each deformable mechanism extends substantially in an occupied space with regard to a width of the corresponding arm.

7. A seeder according to claim 1, wherein wheels are mounted at a front of the transverse beam.

8. A seeder according to claim 7, wherein the arm is linked to the chassis by a first articulation with an axis that is substantially horizontal and parallel to the direction of advance, the first articulation extends in a vicinity of the wheel mounted on the central section.

9. A seeder according to claim 1, wherein in the transport position the seeding elements are distributed on two heights.

* * * * *